United States Patent
Donnelly et al.

(10) Patent No.: US 7,135,234 B2
(45) Date of Patent: Nov. 14, 2006

(54) MULTILAYER COEXTRUSIONS

(75) Inventors: Karen D. Donnelly, Allison Park, PA (US); Robert Dorville Roberts, Palmer, MA (US); John Chi Hee Kwok, Moon Township, PA (US); Chris K. Hung, Calgary (CA); Trevor Dean Pacholok, Columbus, OH (US)

(73) Assignee: Nova Chemicals (International) S.A., Fribourg (CH)

( * ) Notice: Subject to any disclaimer, the term of this patent is extended or adjusted under 35 U.S.C. 154(b) by 243 days.

(21) Appl. No.: 10/851,268

(22) Filed: May 21, 2004

(65) Prior Publication Data

US 2004/0253468 A1 Dec. 16, 2004

(51) Int. Cl.
*B32B 27/08* (2006.01)
*B32B 27/30* (2006.01)

(52) U.S. Cl. .............. 428/519; 428/517; 428/520; 428/521

(58) Field of Classification Search .............. 428/517, 428/519, 520, 521
See application file for complete search history.

(56) References Cited

U.S. PATENT DOCUMENTS

| | | | |
|---|---|---|---|
| 4,440,824 A | 4/1984 | Bonis | |
| 4,626,455 A | 12/1986 | Karabedian | |
| 4,879,177 A | 11/1989 | Boice | |
| 5,079,296 A | 1/1992 | Thompson et al. | |
| 5,106,696 A * | 4/1992 | Chundury et al. | 428/517 |
| 5,219,666 A | 6/1993 | Schirmer et al. | |
| 5,310,950 A | 5/1994 | Mannion | |
| 5,344,878 A | 9/1994 | Colella et al. | |

* cited by examiner

*Primary Examiner*—D. S. Nakarani
(74) *Attorney, Agent, or Firm*—Suzanne Kikel

(57) ABSTRACT

A multilayer thermoplastic extruded structure comprises at least one thermoplastic polyolefin layer; at least one thermoplastic vinyl aromatic polymer layer; and a multicomponent tie layer. The multicomponent tie layer comprises at least one thermoplastic polyolefin; at least one thermoplastic vinyl aromatic polymer; and at least one styrenic block copolymer. Preferred structures are multilayer films used for packaging or multilayer sheets for thermoformed containers.

2 Claims, No Drawings

MULTILAYER COEXTRUSIONS

FIELD OF THE INVENTION

This invention relates to coextruded, multilayer thermoplastic structures.

BACKGROUND OF THE INVENTION

Thermoplastic polyolefins (such as polyethylene and polypropylene) are ubiquitous items of commerce. Large volumes of these thermoplastics are extruded into sheets and films. Polyolefin films are widely used for packaging a wide variety of goods.

Thermoplastic polymers of vinyl aromatic monomers (such as styrene and alpha methyl styrene) are also well known. Such thermoplastic polymers (also sometimes referred to herein as thermoplastic styrenic polymers) are commonly used to provide rigid, clear packages for foods such as bakery goods, or opaque thermoformed containers for food and drink. Foamed polystyrene is often used to produce "clam shell" packages for take-out foods and to produce impact-resistant packages for eggs. However, polystyrene film is not in widespread use as a packaging material. Polystyrene tends to become highly oriented when extruded into thin films. This orientation may be used to generate a "splitty" film (i.e. a film with poor tear strength in the "machine direction") or a film with predictable shrink behavior.

It is known in the art to prepare co-extruded structures having a thermoplastic polyolefin layer and a thermoplastic polystyrene layer. However, it will be recognized by those skilled in the art that thermoplastic polyolefins and thermoplastic styrenic polymers have different polarities. Accordingly, it is difficult to produce such coextruded structures with layers which adhere to one another. The prior art discloses several attempts to mitigate this adhesion problem, as briefly set out below.

U.S. Pat. No. 4,626,455 (Karabedian, to Owens-Illinois) teaches a two layer coextruded structure in which a foamed polystyrene layer is adhered to a polyolefin layer. The polyolefin layer also contains polystyrene and a compatibility agent which is preferably a styrene-butadiene block copolymer.

U.S. Pat. No. 4,440,824 (Bonis, to Composite Container, Inc.) teaches a multilayer coextruded structure comprising a polyolefin layer; a high impact polystyrene layer; and an adhesive tie layer which is prepared from either ethylene-vinyl acetate copolymer or an ethylene-acrylic acid copolymer.

U.S. Pat. No. 5,219,666 (Schirmer et al., to W. R. Grace & Co.) teaches a five layer film in which two outer (skin) layers of styrene butadiene copolymer are bonded to a core layer of very low density polyethylene using two ethylene-vinyl acetate tie layers (with each tie layer being located between the core layer and the two skin layers).

U.S. Pat. No. 4,879,177 (Boice, to W. R. Grace & Co.) also teaches a five layer film in which a core layer (which may be a butadiene styrene copolymer) is sandwiched between two ethylene copolymer tie layers. The outer or skin layers of this structure are ethylene propylene copolymers, polypropylene or blends thereof.

SUMMARY OF THE INVENTION

In one embodiment of this invention there is provided a multilayer structure comprising at least three layers:

A) a first layer comprising at least one thermoplastic polyolefin;
B) a second layer comprising at least one thermoplastic vinyl aromatic polymer; and
C) a tie layer located between said first layer and said second layer wherein said tie layer comprises a blend of:
  C1) a thermoplastic polyolefin;
  C2) a thermoplastic vinyl aromatic polymer; and
  C3) a styrenic block copolymer.

In one preferred embodiment there is provided a multilayer film structure wherein said first layer comprises at least one polyethylene; said second layer comprises thermoplastic vinyl aromatic polymer selected from the group consisting of:

a) a blend of crystal polystyrene and a thermoplastic styrene butadiene copolymer; and
b) an impact modified styrene/methylmethacrylate copolymer, wherein said styrenic block copolymer C3 contained in said blend of said tie layer comprises a block copolymer selected from the group consisting of styrene-butadiene block polymers; styrene-isoprene diblock polymers; styrene-butadiene-styrene block polymers; styrene-isoprene-styrene block polymers; and hydrogenated resins of any of said block polymers.

DETAILED DESCRIPTION

The multilayer structure of this invention must contain at least one layer of a thermoplastic polyolefin. The term thermoplastic polyolefin is intended to convey its conventional meaning, namely a plastic which is prepared from at least one olefinic monomer (such as ethylene, propylene, butene, hexene or octene) that may be extruded or molded after being, melted. Preferred thermoplastic polyolefins are polyethylene and polypropylene. Preferred polyethylenes are homopolymers of ethylene or copolymers of ethylene with a minor amount (less than 15 mole %) of at least one alpha olefin selected from the group consisting of butene, hexene and octene. Preferred polyethylenes may be prepared by any of the polymerization processes which are in commercial use (such as the so-called "high pressure" process; slurry process; solution process and/or gas phase process) and with the use of any of the known catalysts (including the so-called Ziegler Natta catalysts; chromium or Phillips catalysts; single site catalysts; and metallocene catalysts). Highly preferred polyethylene is linear low density polyethylene ("lldpe") having a melt index, "$I_2$" (as determined by ASTM standard test D1238 at 190° C. under a 2.16 kilogram load) of from 0.3 to 20 grams per 10 minutes (especially from 0.5 to 5 g/10 minutes) and a density of from 0.900 to 0.945 grams per cubic centimeter, "g/cc" (especially from 0.915 to 0.940 g/cc).

Such lldpe polymers are typically copolymers of ethylene with a small amount of at lease one comonomer selected from butene, hexene and octene.

Preferred polypropylenes are polypropylene copolymers. Most preferred are clarified polypropylene copolymers. Clarified polypropylene is a term known to those skilled in the art and refers to polypropylene which has been treated with a nucleating agent such as dibenzylidene sorbitol ("DBS"), as disclosed in U.S. Pat. No. 5,310,950 (Mannion et al.).

The term "thermoplastic vinyl aromatic polymer" is meant to broadly refer to a thermoplastic (which, as above, may be molded or extruded after being melted) which is prepared using a vinyl aromatic monomer as the predominant monomer. The term vinyl aromatic monomer includes styrene; alpha methyl styrene; para methyl styrene; and tertiary butyl styrene. The thermoplastic polymers may also contain a comonomer such as a (meth)acrylate (including methylmethacrylate; ethyl methacrylate; methyl acrylate; ethyl acrylate and butyl acrylate) and/or a $C_{4-6}$ conjugated diene such as butadiene or isoprene. Thermoplastic styrene-butadiene copolymers (such as those sold under the name K-Resin™ by Chevron Phillips Chemical Company may also be included. Blends of such thermoplastic styrene-butadiene copolymers with other thermoplastic vinyl aromatic polymers (such as crystal polystyrene and/or thermoplastic styrene/methylmethacrylate resin—as disclosed in U.S. Pat. No. 5,344,878 and U.S. Pat. No. 5,079,296, and also referred to as "impact modified styrene/methylmethacrylate copolymer" are also suitable.

Preferred thermoplastic vinyl aromatic polymers include (i) impact modified styrene/methylmethacrylate copolymer; (ii) the aforementioned K-Resin (especially the grade known as KR10, which is believed to be a copolymer of about 75 weight % styrene and 25 weight % butadiene); and (iii) blends of "K-Resin" (or similar thermoplastic styrene-butadiene copolymers) with crystal polystyrene.

The "tie layer" of co-extruded structures according to this invention is located between the layer of thermoplastic vinyl aromatic polymer and the polyolefin layer.

The tie layer comprises at least three essential components, namely:

1) a thermoplastic polyolefin;
2) a thermoplastic vinyl aromatic polymer; and
3) a styrenic block copolymer.

Preferred tie layers for film structures contain from 35 to 65 weight % of thermoplastic olefin (especially from 55 to 60 weight %); from 10 to 30 weight % thermoplastic vinyl aromatic polymer (especially from 15 to 20 weight %) with the balance being a styrenic block copolymer as defined hereinafter.

Preferred tie layers for sheet structures contain from 20 to 60 weight % polypropylene (especially 40 to 50 weight %); from 20 to 60 weight % polystyrene (especially from 40 to 50 weight %) with the balance being a styrenic block copolymer.

The styrenic block copolymer used in the tie layer is a copolymer of at least one vinyl aromatic monomer (as described above, with styrene being particularly preferred) and at least one other olefin or diolefin monomer, especially a $C_4$ to $C_6$ conjugated diene (with butadiene and/or isoprene being preferred). The unsaturation in the styrene-conjugated diene block copolymers may optionally be hydrogenated. Such copolymers are reported to be prepared by "block" polymerization using an anionic imitator (such as an alkyl lithium; especially butyl lithium). In a "block" polymerization, one monomer (e.g. the vinyl aromatic monomer) is initially polymerized, followed by the polymerization of the other monomer (e.g. butadiene). The resulting "blocks" of styrene polymer and butadiene polymer can provide a styrenic block copolymer. These polymers may be diblock (e.g. styrene/butadiene) or multiblock (e.g. styrene/butadiene/styrene). Preferred styrenic block copolymers for use in the structures of this invention contain blocks of styrene and blocks of butadiene with from about 35 to 55 weight % bound styrene and a number average molecular weight of from about 50,000 to about 100,000. Such styrenic block copolymers are available under the trademark KRATON™ from KRATON Polymers U.S. L.L.C. of Houston, Tex.

The multilayer structures of this invention must contain at least three layers—i.e. the thermoplastic polyolefin layer (TPO); the thermoplastic vinyl aromatic layer (TVA); and a tie layer (TL) which is located between the TLO layer and the TVA layer. This may be described as a TPO/TL/TVA structure. Preferred film structures contain five layers, with the TVA layer being the core layer. Using the above nomenclature, this preferred five layer structure may be described as TPO/TL/TVA/TL/TPO.

It is generally preferred that the multilayer films of this invention contain about 5 to 25 weight % of tie layer material (based on the total weight of the multilayer structure). The tie layers is preferably used in amounts of from 5 to 10 weight % when preparing sheet structures, though it is possible to prepare useful structures which contain less than 1% tie layer material (as illustrated in the examples). The amount of material used in the other layers may be widely varied to suit different end use. For example, a multilayer film (to be used for packaging) preferably containing similar amounts of polyolefin and thermoplastic vinyl aromatic resin (e.g. from 10 to 20 weight % "tie layer" and 40–50 weight % in each of the TPO and TVA layers, as illustrated in the examples).

In another experimental example, multilayer sheet structures are shown where the TPO layer is less than 5 weight % of the overall structure (see Table 5).

It is also within the scope of this invention to pre-mix the tie layer material with a part of the material used for one of the outer layers (prior to extrusion). This is preferred practice when only a very small weight % of the overall structure is contained in either the TPO layer of the TVA layer.

In a preferred embodiment, the multilayer co-extruded structure of this invention is prepared on an extruded film line with "blown" film lines being particularly preferred. It is especially preferred to use the so-called "double bubble" process if it is desired to prepare a shrink film. The extruded film lines which may be used to prepare the structures of the present invention are well known to those skilled in the art and are referred to in the aforementioned U.S. Pat. No. 5,219,666 and described in further detail in the following non-limiting examples.

In a second preferred embodiment, the multi-layer co-extruded structure of this invention is prepared on an extruded sheet line. The extruded sheet lines which may be used to prepare the structures of the present invention are well known to those skilled in the art and are described in further detail in the following non-limiting examples.

EXAMPLES

Blown Film

Three layer structures were prepared using a conventional co-extrusion blown film line (manufactured by Brampton Engineering).

The three layer circular die was tapered or "streamlined" with a base diameter of about 6 inches (about 15 centimeters) and an exit lip diameter of about 4 inches (about 10 centimeters). Each die layer was fitted with a 35 mil die pin.

The three layer die was fed with three extruders, each fitted with an extruder screw having a diameter of about 1¾" (about 4.5 cm) and a length/diameter ration of 30/1.

This blown film line was fitted with a chilled air ring and a bubble stabilizing cage that could be controlled to blow up ratio ("BUR") of from about 1.5:1 to 4.0:1.

Three layer structures were prepared using the formulations shown in the accompanying tables. These three layer structures may be regarded as a proxy for one half of a five layer structure (i.e. A/B/C is a proxy for A/B/C/B/A).

The films were extruded using a BUR of about 2.3:1 to 2.5:1. The total mass flow rate of the resins used to produce the three layers was about 100 lbs/hr (and the accompanying tables show the weight % of each of the layers of the total mass flow rate).

Each of the three extruders was operated at a temperature aiming point of between 370° and 400° F. The die temperature aiming point was 400° F.

As previously discussed, the "tie layer" (TL) of the films of this invention contains a thermoplastic polyolefin, a thermoplastic vinyl aromatic polymer, and an styrenic block copolymer of a $C_{4 to 6}$ conjugated diene monomer and a vinyl aromatic monomer.

Table 1 below illustrates formulations for two different tie layers (referred to as TL1 and TL2) according to this invention.

TABLE 1

| Formulation | Component 1 (weight %) | Component 2 (weight %) | Component 3 (weight %) |
|---|---|---|---|
| TL1 | PE1 (60) | PS1 (25) | SB1 (15) |
| TL2 | PE1 (55) | PS1 (25) | SB1 (20) |

Notes:
PE1 = linear low density polyethylene sold by NOVA Chemicals Corporation (NCC) under the trademark SCLAIR ™ 11G1.
PS1 = crystal polystyrene having an ASTM flow rate (200° C./5.0 kg; formerly condition G) of 1.9 grams per 10 minutes.
SB1 = styrenic block copolymer of styrene and butadiene sold by KRATON Polymers U.S. LLC under the trademark KRATON ™ G-1652.

Thus, for clarity, Table 1 shows that the formulation of tie layer TL1 contains 60 weight % polyethylene, 25 weight % polystyrene and 15 weight % of the styrenic block copolymer.

TABLE 2

| | INVENTIVE | | |
|---|---|---|---|
| Experiment | Extruder A Recipe/Flow Rate (weight %) | Extruder B Recipe/Flow Rate (weight %) | Extruder C Recipe/Flow Rate (weight %) |
| 1 | TVA1/50 | TL1/20 | TPO1/30 |
| 2 | TVA2/55 | TL1/20 | TPO1/25 |
| 3 | TVA1/50 | TL1/20 | TPO1/30 |
| 4 | TVA2/55 | TL1/20 | TPO1/25 |

Notes:
TVA1 = a mixture of 60 weight % crystal polystyrene having an ASTM flow rate (200° C./5.0 kg; formerly condition G) of 1.9 grams per 10 minutes with 40 weight % K-Resin ™ KR10.
TVA2 = styrenic-acrylic polymer sold by NCC under the trademark ZYLAR ™ 390.
TPO1 = linear low density polyethylene sold by NCC under the trademark SCLAIR ™ 11G1.

The tie layer formulations shown in Table 1 were melt blended in a single screw extruder and pelletized.

Three layer coextruded films were then made on the Brampton Engineering blown film line described above using the formulations shown in Table 2. For clarity, the first three layer film described in Table 2 was prepared with a middle layer of the formulation described as TL1 in Table 1 (with the middle layer being about 20 weight % of the total film structure) and two outer layers, namely a polyethylene outer layer (shown as TPO1, Extruder C in Table 2—in an amount of 30 weight % of the total film structure) and a styrenic polymer outer layer (shown as TVA1, Extruder A in Table 2—in an amount of 50 weight % of the total film structure).

The four inventive films shown in Table 2 also produced clear, stiff films with good lamination between the layers. The compositions shown in Table 2 also "processed" well (i.e. the blown film bubble produced by the machinery was stable).

Table 3 illustrates various comparative (non-inventive formulations). None of the compositions shown in Table 3 processed well. In particular, the "bubble" produced from these compositions was unstable and running times in excess of 15 minutes could not be regularly achieved.

Table 3 provides data which describe comparative (non-inventive) 3 layer film structures.

TABLE 3

| | COMPARATIVE | | |
|---|---|---|---|
| Experiment | Extruder A | Extruder B | Extruder C |
| 1-C | PE | 25% TL3 50% PS3 25% PS4 | PE |
| 2-C | 95% PE 5% EVA | 25% TL3 50% PS3 25% PS4 | 95% PE 5% EVA |
| 3-C | 90% PE 10% EVA | 37.5% PS3 37.5% PS4 2.5% TL3 | 90% PE 10% EVA |
| 4-C* | 90% PE 10% EVA | 37.5% PS3 37.5% PS4 2.5% TL3 | 90% PE 10% EVA |
| 5-C* | 90% PE 10% EVA | 42.5% PS3 42.5% PS4 1.5% TL3 | 90% PE 10% EVA |

Notes:
1. All of the experiments of Table 3 when run with the mass flow rates to extruders A, B and C being 30% to Extruder A; 40% to Extruder B; and 30% to Extruder C (all by weight).
2. The tie layer composition (TL3) used in all experiments was 60 weight % linear low density polyethylene; 25 weight % general purpose crystal polystyrene; and 15% styrene-butadiene elastomeric block copolymer.
3. PE = linear low density polyethylene.
4. PS3 = polystyrene having an ASTM flow rate (200° C./5.0 kg; formerly condition G) of 5.5 grams per 10 minutes.
5. PS4 = polystyrene having an ASTM flow rate (200° C./5.0 kg; formerly condition G) of 38.0 grams per 10 minutes.
6. EVA = thermoplastic ethylene-vinyl acetate copolymer.

Extruded Sheet

Three layer structures were prepared using a conventional extruded sheet line (manufactured by Welex Inc.).

The forty-inch wide die is a Masterflex R/LD-75 die (Production Components Chippewa Valley Die Inc.) with a coat hanger flow, a standard manifold, multiple flexible lips for thickness adjustment, and an adjustable restrictor bar in the die with a Masterflex break-away coupler adjustment system.

The multi-layer die is fed with three extruders of different sizes. The primary extruder is a two stage vented extruder fitted with a screw having a diameter of about 2½" (about 6.4 cm) and a length/diameter ratio of 30/1. The secondary extruder is a two stage un-vented extruder fitted with a screw having a diameter of about 2½" (about 6.4 cm) and a length/diameter ratio of 30/1. The tertiary extruder is a single stage un-vented extruder fitted with a screw having a diameter of about 1½" (about 3.8 cm) and a length/diameter ratio of 24/1.

This die/extruder arrangement is capable of producing up to five-layer films. Three layer structures were prepared using the formulations shown in the accompanying tables.

The total mass flow rate of the resins used to produce the three layers was about 260 lbs/hr (and the accompanying tables show the weight % of each of the layers of the total mass flow rate).

The extruders were operated using temperature zones ranging from 350° and 475° F. The melt temperatures ranged from 300 to 425° F. The three rolls in the roll stack were held to 135° F. (top roll), 150° F. (middle roll), and 170° F. (bottom roll). The polishing roll speed was 10.2 feet/minute (6 amps), and the pull roll speed was 9.8 feet/minute (5 amps).

As previously discussed, the "tie layer" (TL) of the sheets of this invention contains a thermoplastic polyolefin, a thermoplastic vinyl aromatic polymer, and a styrenic block copolymer of a $C_{4 \text{ to } 6}$ conjugated diene monomer and a vinyl aromatic monomer.

Table 4 below illustrates formulations for two different tie layers (referred to as TL4 and TL5) according to this invention.

TABLE 4

| Formulation | Component 1 (weight %) | Component 2 (weight %) | Component 3 (weight %) |
|---|---|---|---|
| TL4 | PP1 (45) | PS5 (45) | SB1 (10) |
| TL5 | PP1 (40) | PS5 (40) | SB1 (20) |

Notes:
PP1 = clarified polypropylene sold by Huntsman Corporation as P5M4K-0007.
PS5 = crystal polystyrene having an ASTM flow rate (200° C./5.0 kg; formerly condition G) of 11.0 grams per 10 minutes.
SB1 = styrenic block copolymer of styrene and butadiene sold by KRATON Polymers U.S. LLC under the trademark KRATON™ G-1652.

Thus, for clarity, Table 4 shows that the formulation of tie layer TL4 contains 45 weight % polypropylene, 45 weight % polystyrene and 10 weight % of the styrenic block copolymer. The tie layer formulations shown in Table 4 were melt blended in a single screw extruder and pelletized.

TABLE 5

| | INVENTIVE | | |
|---|---|---|---|
| Experiment | Extruder A Recipe/Flow Rate (weight %) | Extruder B Recipe/Flow Rate (weight %) | Extruder C Recipe/Flow Rate (weight %) |
| 1 | TVA3 (64.6) | TVA5 (30.8) | TPO2 (4.6) |
| 2 | TVA3 (65.1) | TVA6 (31.8) | TPO2 (3.1) |

Notes:
TVA3 = a mixture of 40 weight % crystal polystyrene having an ASTM flow rate (200° C./5.0 kg; formerly condition G) of 11.0 grams per 10 minutes with 60 weight % K-Resin KR03.
TVA5 = a 95/5 mixture of TVA3 and TL5.
TVA6 = a 98/2 mixture of TVA3 and TL5.
TPO2 = clarified polypropylene sold by Huntsman Corporation as P5M4K-007.

Three layer coextruded sheets were then made on the Welex extruded sheet line described above using the formulations shown in Table 5. For clarity, the first three layer sheet described in Table 5 was prepared with a middle layer that contained 95% of the TVA3 formulation and 5% of the formulation described as TL5 in Table 4 (with the middle layer being about 31.8 weight % of the total sheet structure) and two outer layers, namely a polyethylene outer layer (shown as TPO2, Extruder C in Table 5—in an amount of 3.0 weight % of the total sheet structure) and a styrenic polymer outer layer (shown as TVA3, Extruder A in Table 5—in an amount of 61.2 weight % of the total sheet structure).

The two inventive sheets shown in Table 5 produced clear, flexible sheet with good lamination between the layers. The compositions shown in Table 5 also "processed" well (i.e. high sheet throughput using styrenic processing conditions). Polypropylene materials are not as easy to process as styrenic materials. However polypropylene provides grease and oil resistance not obtained with purely styrenic compositions.

What is claimed is:

1. A co-extruded multilayer film or sheet structure comprising at least three layers:
   A) a first layer comprising at least one thermoplastic polyolefin;
   B) a second layer comprising an impact modified styrene/methylmethacrylate copolymer; and
   C) a tie layer located between said first layer and said second layer wherein said tie layer comprises a blend of:
      C1) a thermoplastic polyolefin;
      C2) a thermoplastic vinyl aromatic polymer; and
      C3) a styrenic block copolymer,
      wherein said block copolymer C3 is selected from the group consisting of styrene-butadiene block polymers; styrene-isoprene diblock polymers; styrene-butadiene-styrene block polymers; styrene-isoprene-styrene block polymers; and hydrogenated resins of any of said block polymers.

2. The co-extruded film or sheet of claim 1 wherein said tie layer is a composition selected from the group consisting of:
   a) a blend of linear low density polyethylene, crystal polystyrene and said styrenic block copolymer C3, and
   b) a blend of linear low density polyethylene, crystal polystyrene, said styrenic block copolymer C3, and optionally thermoplastic styrene-butadiene copolymer.

* * * * *